No. 624,284. Patented May 2, 1899.
A. A. ZALONDEK.
BACK PEDALING BRAKE.
(Application filed Aug. 31, 1898.)

(No Model.)

WITNESSES:
J. A. Brophy
C. R. Ferguson

INVENTOR
A. A. Zalondek,
BY
ATTORNEYS.

UNITED STATES PATENT OFFICE.

ANTONE A. ZALONDEK, OF OKLAHOMA, OKLAHOMA TERRITORY.

BACK-PEDALING BRAKE.

SPECIFICATION forming part of Letters Patent No. 624,284, dated May 2, 1899.

Application filed August 31, 1898. Serial No. 689,899. (No model.)

*To all whom it may concern:*

Be it known that I, ANTONE A. ZALONDEK, of Oklahoma city, in the county of Oklahoma and Territory of Oklahoma, have invented a new and Improved Bicycle-Brake, of which the following is a full, clear, and exact description.

This invention relates to improvements in brakes for bicycles; and the object is to provide a brake of simple and comparatively inexpensive construction that may be applied to the rear wheel by holding or by a slight reverse movement of the cranks.

I will describe a brake embodying my invention and then point out the novel features in the appended claims.

Reference is to be had to the accompanying drawings, forming a part of this specification, in which similar characters of reference indicate corresponding parts in all the views.

Figure 1:
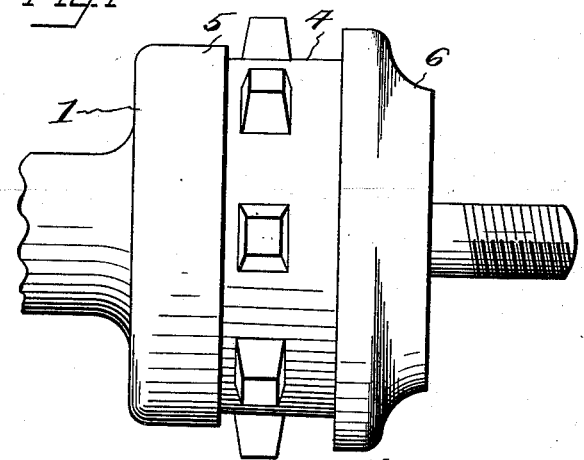
Figure 2:
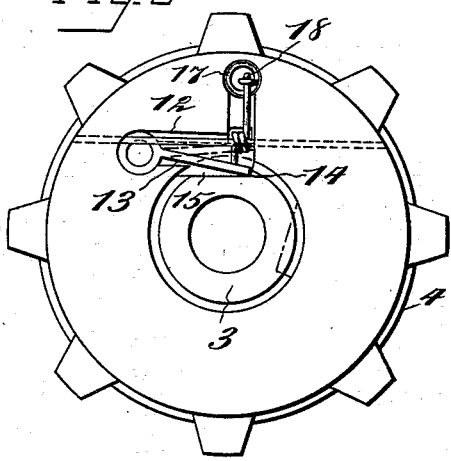
Figure 3:
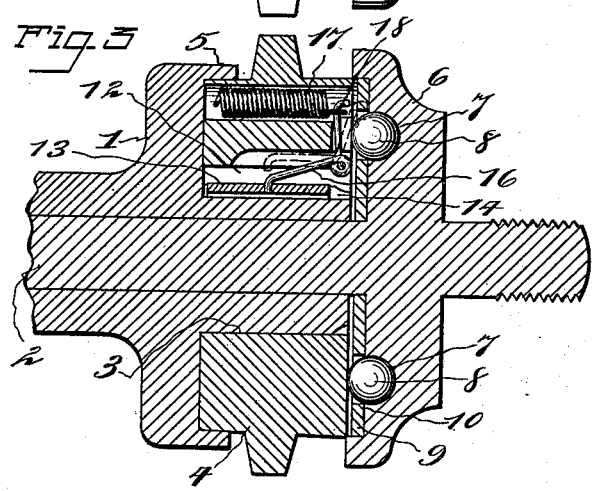
Figure 4:
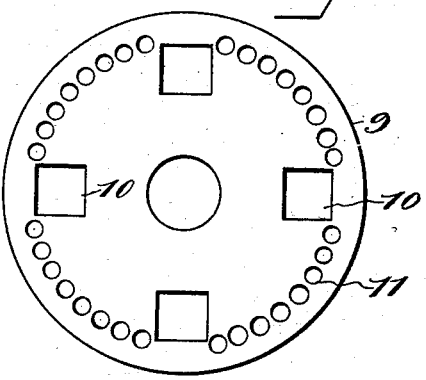
Figure 5:
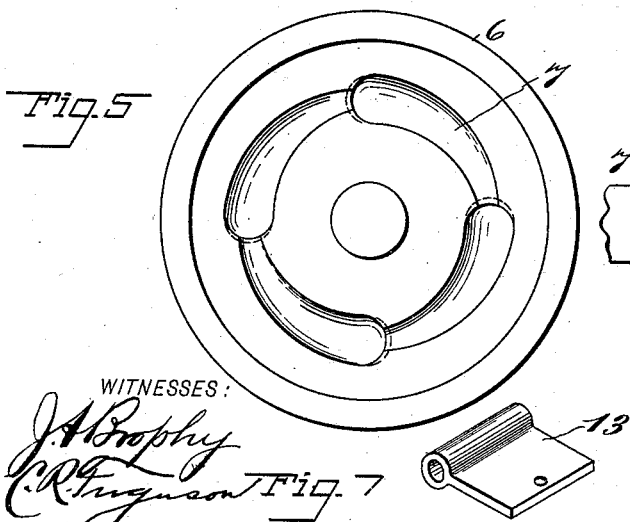
Figure 6:
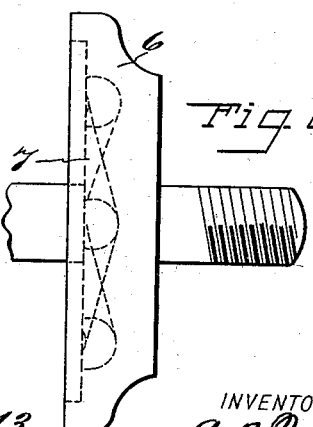
Figure 7:
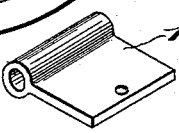

Figure 1 is a side view of a brake embodying my invention. Fig. 2 is an inside face view of the sprocket-wheel employed in connection with the brake. Fig. 3 is a sectional view of the brake mechanism. Fig. 4 shows a retaining-plate employed. Fig. 5 is an inside face view of the brake-disk. Fig. 6 is an edge view thereof, and Fig. 7 is a perspective view of the brake-dog.

Referring to the drawings, 1 designates the hub of the rear wheel, mounted to rotate on the axle 2. This hub has a sleeve portion 3, on which a sprocket 4 is rotatively mounted, and the hub has a peripheral flange 5, which extends upon the periphery of the sprocket to serve as a guard to prevent the entrance of dust or dirt.

Rigidly fixed to the axle 2, at the outer side of the sprocket, is a brake-disk 6, in which is formed a series of segmental recesses 7, which gradually decrease in depth from one end to the other and in which are placed friction-balls 8. I have here shown four recesses 7 and an equal number of friction-balls; but it is to be understood that a greater or less number may be employed without departing from the spirit of my invention. Arranged between the disk 6 and the sprocket 4 is a retaining-disk 9, having a series of holes 10, through which the balls 8 project to engage with the sprocket, and the disk is also provided near its periphery with perforations 11 for a purpose to be hereinafter described.

Arranged in a recess 12, formed in the sprocket and adapted to swing radially of the sprocket, is a dog 13, designed to engage its free end with a shoulder 14 at the end of a depression 15 in the sleeve 3. An angle-lever 16, pivoted in the sprocket 4, has one of its members engaged with the dog 13, and its other member has connection with one end of a coiled spring 17, arranged in a transverse recess in the sprocket, the other end of said spring being connected to the sprocket. The end of the lever 16, engaged by the spring 17, is turned outward, as at 18, to engage in one of the perforations 11 of the disk 9.

In operation the balls 8 will lie in the deeper ends of the depressions 7 and have but little or no bearing against the sprocket. In operating the pedals to move the bicycle forward the sprocket-chain will move the sprocket 4 to a position to cause the dog 13 to engage its end with the shoulder 14, and consequently the hub 1 will be rotated with the sprocket. When it is desired to apply the brake, the rider either holds the pedals still or back pedals, which will cause the dog 13 to ride upon the larger diameter of the sleeve 3. The rocking movement of the dog will rock the lever 16 against the resistance of the spring 17, causing the projection 18 to pass into one of the perforations 11, so as to rotate the disk 9 relatively to the disk 6. This will move the balls into shallower portions of the depressions 7, causing them to force the sprocket against the hub 1 and by friction brake the wheel.

Obviously the brake may be applied with more or less power to stop the wheel or to retard its speed.

Having thus described my invention, I claim as new and desire to secure by Letters Patent—

1. In a bicycle-brake, a wheel-hub having an outwardly-extended sleeve, an axle on which the hub is mounted to rotate, a disk fixed to the axle, a sprocket mounted loosely on the sleeve between the disk and hub, a swinging dog carried by the sprocket and adapted to engage a shoulder on the sleeve, a ball arranged in a recess formed in the disk the said recess gradually diminishing in depth, and means actuated by a movement of the dog to cause the ball to move within a shallow portion of the recess and force the sprocket against the hub, substantially as specified.

2. In a bicycle-brake, a rear-wheel hub having an outwardly-extending sleeve, an axle on which the hub is mounted to rotate, a disk affixed to said axle and having in its inner face a recess of gradually-diminishing depth, a rolling device seated in said recess, a disk rotatively mounted on the axle and having a hole through which the ball projects, a dog arranged in the sprocket and adapted to engage a shoulder on the sleeve, and means actuated by a movement of said dog, for engaging the disk to cause it to move the ball into a shallow portion of its recess, substantially as specified.

3. In a bicycle-brake, a rear-wheel hub, having an outwardly-extended sleeve, an axle passing through the sleeve and hub, a disk rigidly mounted on the axle and having a series of segmental depressions of gradually-diminishing depth from one end to the other, balls seated in said depressions, a retaining-plate having holes through which the balls project, the said plate also having perforations near its periphery, a sprocket mounted on the sleeve, a dog arranged in the sprocket and adapted to engage a shoulder formed on the sleeve, an angle-lever in the sprocket having one member engaged with the dog, a spring engaging with the other member of the lever, and a projection on said lever for passing into a perforation of the retaining-plate, substantially as specified.

ANTONE A. ZALONDEK.

Witnesses:
JOHN HOABE,
WILLIAM T. TAYLOR.